United States Patent [19]

Kobylinski et al.

[11] 3,965,040

[45] June 22, 1976

[54] PROCESS FOR PREPARING CATALYST

[75] Inventors: Thaddeus P. Kobylinski; Brian W. Taylor, both of Gibsonia; Roger F. Vogel, Butler, all of Pa.

[73] Assignee: Gulf Research & Development Company, Pittsburgh, Pa.

[22] Filed: Sept. 25, 1974

[21] Appl. No.: 509,073

[52] U.S. Cl.................................. 252/435; 252/437; 252/460; 252/466 PT; 252/472
[51] Int. Cl.².................... B01J 27/14; B01J 29/12; B01J 23/40
[58] Field of Search....... 252/435, 437, 460, 466 PT

[56] References Cited

UNITED STATES PATENTS

| 2,890,167 | 6/1959 | Haensel | 252/435 X |
| 3,202,480 | 8/1965 | Nixon | 252/435 X |

Primary Examiner—Carl F. Dees

[57] ABSTRACT

A process for preparing a catalyst which involves coating a support with a platinum or palladium salt, calcining, further coating the calcined support with a solution containing a ruthenium or rhodium salt and an oxide, salt or acid of phosphorus and then further calcining.

24 Claims, No Drawings

PROCESS FOR PREPARING CATALYST

This invention relates to a process for coating a support with a platinum or palladium salt, calcining, further coating the calcined support with a solution containing a ruthenium or rhodium salt and an oxide, salt or acid of phosphorus and then further calcining.

During normal operation of an internal combustion engine, such as that of an automobile, the principal undesirable components in the exhaust gas, namely, nitrogen oxides, carbon monoxide and unburned hydrocarbons, that are discharged into the atmosphere can be reduced in amount by first passing the exhaust gas over ruthenium and/or rhodium under a reducing atmosphere to convert the nitrogen oxides selectively to nitrogen and then passing the treated gas, together with added oxygen, over platinum and/or palladium under an oxidizing atmosphere to convert the carbon monoxide and unburned hydrocarbons to carbon dioxide and water. By "reducing atmosphere" we mean an atmosphere wherein the stoichiometric ratio of molecular oxygen to reducing agents in the reaction zone is less than 1:1, preferably about 0.9:1 or even less. By "oxidizing atmosphere" we mean an atmosphere wherein the stoichiometric ratio of oxygen to reducing agents (for example, carbon monoxide plus hydrocarbons) is at least about 1:1, preferably about 2:1 or more.

During startup or cold start, however, when the engine is cold and operation thereof is effected under closed choke where the air to fuel ratio is lower than stoichiometrically required with a small amount of air, the engine exhaust contains insignificant amounts of nitrogen oxide but significantly larger amounts of carbon monoxide and unburned hydrocarbons than would be present during normal operation. Similarly, the ruthenium or rhodium catalysts and the platinum or palladium catalysts are at ambient temperature and will not begin to perform their intended functions until reaction temperature is reached. Since the amount of nitrogen oxides present during startup under closed coke is small, no problem exists during such period because of the inactivity of ruthenium. However, the presence of large amounts of carbon monoxide and unburned hydrocarbons in the exhaust gas from the beginning of operation requires that they be converted immediately to the less innocuous carbon dioxide and water. However, since the platinum catalyst is located at a further distance from the engine, it will require a relatively long time for the exhaust gases to raise the temperature thereof to a level at which desired oxidation of carbon monoxide and unburned hydrocarbons takes place. Until such temperature level is reached the undesired carbon monoxide and unburned hydrocarbons will be discharged into the atmosphere.

Ruthenium, on the other hand, is closer to the engine manifold and it will reach a higher temperature level sooner than platinum. Therefore, it might be expected that during startup oxygen could be introduced into the exhaust gas prior to its contact with ruthenium so that the ruthenium could serve as oxidation catalyst for the desired conversion of carbon monoxide and unburned hydrocarbons. Thereafter when the platinum catalyst reached reaction temperature, the oxygen flow could then be switched to the mixture entering the platinum reaction zone. Unfortunately, ruthenium is not a satisfactory oxidation catalyst in the defined reaction, for its reactivity is too low to obtain sufficient oxidation at low temperatures.

We have discovered a process that will produce a catalyst that can be used under a reducing atmosphere to convert nitrogen oxides selectively to nitrogen or under an oxidizing atmosphere to convert the carbon monoxide and unburned hydrocarbons to carbon dioxide and water. Under such circumstances, then, not only can the same catalyst be used in each of the two conversion stages defined above, but during startup oxygen can be introduced into the first stage of the process and the catalyst therein will serve as oxidation catalyst for the desired conversion of carbon monoxide and unburned hydrocarbons to carbon dioxide and water. After startup, oxygen introduction to the first stage will be terminated and the two stages can then be operated as described above, under a reducing atmosphere and an oxidation atmosphere, respectively, to remove nitrogen oxides and carbon monoxide and unburned hydrocarbons from the auto exhaust gas.

The support for the catalysts to be used in the process of this invention can be any of the refractory oxide supports well-known in the art, such as those prepared from alumina, silica, magnesia, thoria, titania, zirconia, silica-aluminas, silica-zirconias, magnesia-aluminas, etc. In addition, the support can be an activated carbon, pumice, etc. Other suitable supports include the naturally-occurring clays, such as diatomaceous earth. In general, the surface area of these supports can be from about $1m^2$ to about $500m^2$ per gram, preferably from about $10m^2$ to about $300m^2$ per gram. Additional desirable supports for use herein are the more-recently developed corrugated ceramic materials made, for example, from alumina, silica and magnesia, lithium, etc. An example of such ceramic material is Therma Comb made by American Lava Corporation, Chattanooga, Tennessee, which is more fully described in U.S. Pat. No. 3,444,925. If desired, the metals can be mounted directly onto the surface of the ceramic material or the ceramic material can first be coated with a refractory oxide, such as defined above, prior to the deposition of the metals thereon. The ceramic materials per se have a low surface area and high heat stability, and the addition of the refractory oxide coating increases the surface area to a more desirable range. In addition, these coated ceramics possess the further advantage of being easily formed in one piece. Very little, if any, pressure drop is experienced by the passage of exhaust gases through such ceramic materials.

The first step in the process requires that the support defined above be coated with a salt of platinum or palladium, such as chloroplatinic acid, platinum tetraamine dinitrate, platinum chloride, palladium tetraamino dinitrate, palladium chloride, ammonium chloropallidite, etc. This can be done, for example, by dissolving the selected platinum or palladium salt in a suitable solvent, such as water, ethanol, 2,4-pentanedione, etc., maintained at a temperature of about 5° to about 90° C., preferably about 15° to about 40° C., and a pressure of about −5 to about 10 pounds per square inch gauge, preferably about −1 to about 5 pounds per square inch gauge, immersing the support in the solution for about one second to about three hours, preferably about one minute to about two hours, draining off excess solution, drying in air, for example, at a temperature of about 70° to about 200° C. for about one-half to about 20 hours, and finally calcining in air at a temperature of about 350° to about 700° C., preferably about 400° to about 600° C., and a pressure of about −5 to about 10 pounds per square inch gauge, preferably about −1 to about 5 pounds per square inch gauge, for about one to about 20 hours, preferably about six to about 15 hours. In a preferred embodiment, after draining off the excess solution, but before drying, the support is contacted with a stream of $H_2S$ in order to fix or stabilize, that is, inhibit migration of the platinum or palladium salts. The wet support is contacted with the $H_2S$ at a temperature of about 5° to about 80°C., preferably about 15° to about 40° C., and a pressure of about −5 to about 10 pounds per square inch gauge, preferably about −1 to about 5 pounds per square inch gauge, for a period of about one minute to about four hours, preferably about 15 minutes to about two hours. The amount of $H_2S$ used over such period of time is at least about two times the amount stoichiometrically required for reaction with the metal salt, preferably about two to about 1000 times the stoichiometric amount.

The treated support is then further coated with a solution containing a salt of ruthenium or rhodium and an oxide, salt or acid of phosphorus wherein phosphorus have a valence of +3 or +5. Examples of ruthenium and rhodium salts that can be used include ruthenium chloride, ruthenium acetylacetonate, ruthenium nitrate, ruthenium nitrosonitrate, rhodium chloride, rhodium nitrate, etc., and of oxides, salts or acids of phosphorus include $P_2O_5$, $HPO_3$, $H_3PO_4$, $H_4P_2O_7$, $PCl_3$, $P_2O_3$, $(NH_4)_2HPO_4$, $(NH_4)_3PO_4$, $NH_4H_2PO_4$, etc. This can be done, for example, by dissolving the ruthenium or rhodium salt and the oxide, acid or salt of phosphorus in a suitable solvent, such as water, ethanol, hydrochloric acid, acetylacetone, etc., maintained at a temperature of about 5° to about 80° C., preferably a temperature of about 15° to about 30° C., and a pressure of about −5 to about 10 pounds per square inch gauge, preferably about −1 to about 5 pounds per square inch gauge, immersing the support in the solution for about one second to about three hours, preferably about one minute to about two hours, draining off the excess solution, drying in air, for example, at a temperature of about 70° to about 200° C. for about one-half to about 20 hours, and finally calcining in air at a temperature of about 350° to about 700° C., preferably about 400° to about 600° C., and a pressure of about −5 to about 10 pounds per square inch gauge, preferably about −1 to about 5 pounds per square inch gauge, for about one to about 20 hours, preferably six to about 15 hours.

In a preferred embodiment the solution containing the ruthenium or rhodium salt and an oxide, salt or acid of phosphorus also contains a refractory material, such as a salt of aluminum, titanium, silica, magnesium or zirconium. Examples of such refractory materials are $AlCl_3$, $(Al(NO_3)_3$, $MgCl_2$, $TiCl_4$, etc. These refractory materials have a tendency to help disperse the solution on the surface of the support and to inhibit volatilization of the ruthenium or rhodium. An additional preferred embodiment involves passing ammonia gas over the support after draining off the excess solution of ruthenium or rhodium salt and phosphorus compound but before drying. The ammonia gas can react with excess phosphorus compound on the surface of the support as well as help disperse solution over the support in order to stabilize the same thereon. The ammonia gas is believed to fix the metal and to aid in compound formation. The wet support is contacted with ammonia gas at a temperature of about 5° to about 90° C., preferably about 15° to about 70° C. and a pressure of about −5 to about 10 pounds per square inch gauge, preferably about −1 to about five pounds per square inch gauge, for about one minute to about four hours, preferably about 15 minutes to about two hours. The amount of ammonia gas used over such period of time is at least about two mols per total mols of combined mols of ruthenium or rhodium salt and phosphorus compound on the support being treated, preferably about two to about 1000 mols, per total of such mols.

The amounts of each component present in each of the solutions used herein can vary over a wide range depending upon the specific compounds used and the conditions under which the treatments are made. In any event, the amounts of components used and reaction conditions selected are such that the support will carry from about 0.001 to about two weight per cent, preferably about 0.01 to about 0.8 weight per cent, of platinum or palladium, calculated as elemental metal, based on the weight of the support and from about 0.03 to about two weight per cent, preferably about 0.05 to about one weight per cent, of combined ruthenium or rhodium and phosphorus, calculated as elemental metal, based on the weight of the support. The weight ratio of ruthenium or rhodium relative to phosphorus can be within the range of about 1:0.1 to about 1:400, preferably about 1:1 to about 1:100. The weight ratio of platinum or palladium to combined ruthenium or rhodium and phosphorus can be in the range of about 1:10 to about 10:1, preferably about 1:10 to about 5:1. When $AlCl_3$ is used in the second solution, the final support can carry on its surface aluminum, calculated as metal, relative to combined ruthenium or rhodium and phosphorus, each calculated as metal, in a weight ratio of about 1:0.01 to about 1:100, preferably about 1:0.1 to about 1:10.

The process can better be understood by reference to the following.

EXAMPLE I

Aluminum oxide beads having a diameter of 4 millimeters and a surface area of 180 square meters per gram were immersed either in an aqueous solution containing ruthenium chloride or chloroplatinic acid, dried at a temperature of 120° C. for six hours and calcined at a temperature of 480° C. for 12 hours, such that the final product contained on the surfaces thereof, calculated as metal, 0.2 weight per cent ruthenium or platinum, based on the support. Over a period of three hours a feed gas consisting of one weight per cent carbon monoxide, one weight per cent oxygen and the remainder argon was passed over each of the catalysts so prepared at a gas hourly space velocity (volumes of gas per volume of catalyst per hour) of 20,000. The results obtained are tabulated below in Table I.

Table I

| Temp. °C. | Weight Per Cent CO Converted to $CO_2$ | |
|---|---|---|
| | Catalyst Containing Ruthenium | Catalyst Containing Platinum |
| 150 | 0 | 0 |
| 165 | 0 | 12 |
| 205 | 0 | 100 |
| 249 | 4 | 100 |
| 266 | 10 | 100 |
| 316 | 81 | 100 |
| 400 | 98 | 100 |

EXAMPLE II

Two 9.3 centimeters × 15.2 centimeters EX-20 Corning cordierite monoliths composed of Al$_3$(Mg.FE)$_2$Si$_5$AlO$_{18}$, each carrying a layer of Al$_2$O$_3$ thereon, amounting to about 11 weight per cent based on the uncoated monolith, wherein the Al$_2$O$_3$ has a surface area of 180 square meters per gram, were soaked in an aqueous solution containing 0.08 weight per cent chloroplatinic acid for one hour, drained and then, while still wet, contacted with 10,000 cubic centimeters of H$_2$S gas over a period of one hour at a temperature of 30° C. Two similar monoliths were immersed in an aqueous solution containing 1.05 weight per cent of ruthenium chloride, 10 weight per cent phosphoric acid and two weight per cent of aluminum chloride for one hour, drained and then, whle still wet, contacted with 10,000 cubic centimeters of ammonia gas over a period of one hour at a temperature of 30° C. The first set of monoliths was dried at 120° C. overnight and calcined at 538° C. overnight. The second set of monoliths was dried at 120° C. overnight, calcined for six hours at 260° C. and further calcined at 649° C. overnight. The first set of monoliths carried 0.10 weight per cent platinum, calculated as metal, as coating thereon, while the second set carried 0.12 weight per cent ruthenium.

An exhaust gas from a 350 CID Chevrolet engine was passed separately, but directly, over one of the monoliths so produced containing platinum and one containing ruthenium. The atmosphere therein was a reducing atmosphere. In another set of runs about three volume per cent of oxygen was added to the exhaust gas and the combined gas was passed separately, but directly, over another of the monoliths containing platinum and another containing ruthenium. In this case the atmosphere was an oxidizing atmosphere. The temperature during the treatments was maintained in the range of about 480° to about 560° C. and the gas hourly space velocity was maintained at 60,000. The composition of the gas issuing from the 350 CID Chevrolet engine is set forth below in Table II.

Table II

| Component | Volume Per Cent |
| --- | --- |
| CO | 1.8 |
| H$_2$ | 0.6* |
| CO$_2$ | 14.1 |
| Unburned Hydrocarbons | 1200 ppm |
| O$_2$ | 0.1 |
| NO$_x$ | 900 ppm |
| N$_2$ | Balance |

*Estimated

The results obtained are tabulated below in Table III.

Table III

| Component In Treated Exhaust Gas | Under Reducing Conditions Catalyst Containing Ru | Catalyst Containing Pt | Under Oxidizing Conditions Catalyst Containing Ru | Catalyst Containing Pt |
| --- | --- | --- | --- | --- |
| NO$_x$, ppm | 20 | 250 | 900 | 900 |
| NH$_3$, ppm | 5 | 600 | NT | NT |
| CO, Volume % | NT | NT | 1.5 | 0.1 |
| Unburned Hydrocarbons, ppm | NT | NT | 900 | 40 |

NT - Not Taken

EXAMPLE III

The runs of Example II were repeated except that the second treating solution contained no phosphoric acid. The results obtained are tabulated below in Table IV.

Table IV

| Component In Treated Exhaust Gas | Under Reducing Conditions Catalyst Containing Ru | Catalyst Containing Pt | Under Oxidizing Conditions Catalyst Containing Ru | Catalyst Containing Pt |
| --- | --- | --- | --- | --- |
| NO$_x$, ppm | 29 | 310 | 900 | 900 |
| NH$_3$, ppm | NT | NT | NT | NT |
| CO, Volume % | NT | NT | 1.6 | 0.15 |
| Unburned Hydrocarbons, ppm | NT | NT | 900 | 40 |

NT - Not Taken

EXAMPLE IV

In this Example one monolith, as defined in Example II, was used, but only one impregnating solution, an aqueous solution containing both the ruthenium and platinum salts only, was used. The concentration of platinum and ruthenium salts in the impregnating solution was 0.16 and 1.75 weight per cent, respectively. The treatment with H$_2$S was used but not the treatment with ammonia gas. The drying and calcination steps followed the procedure used subsequent to the ruthenium treatment in Example II. The monolith carried 0.2 weight per cent of ruthenium and 0.2 weight per cent of platinum, as metals, based on the monolith. The catalyst was used to treat the exhaust gas, as in Example II. The results are tabulated below in Table V.

Table V

| Component In Treated Exhaust Gas | Under Reducing Conditions | Under Oxidizing Conditions |
| --- | --- | --- |
| NO$_x$, ppm | 18 | 900 |
| NH$_3$, ppm | 50 | NT |
| CO, Volume % | NT | 1.6 |
| Unburned Hydro- | | |

Table V-continued

| Component In Treated Exhaust Gas | Under Reducing Conditions | Under Oxidizing Conditions |
| --- | --- | --- |
| carbons, ppm | NT | 1000 |

NT - Not Taken

EXAMPLE V

The run of Example IV was repeated except that the solution used during the impregnation step also contained 10 weight per cent of phosphoric acid. The results obtained with this catalyst are tabulated below in Table VI.

Table VI

| Component In Treated Exhaust Gas | Under Reducing Conditions | Under Oxidizing Conditions |
| --- | --- | --- |
| $NO_x$, ppm | 100 | NT |
| $NH_3$, ppm | 100 | NT |
| CO, Volume % | NT | 1.7 |
| Unburned Hydrocarbons, ppm | NT | 1100 |

NT - Not Taken

EXAMPLE VI

A monolith as described in Example II was immersed in an aqueous solution containing 1.05 weight per cent of ruthenium chloride, 10.0 weight per cent phosphoric acid and 2.0 weight per cent of aluminum chloride for one hour, drained and then, while still wet, contacted with 10,000 cubic centimeters of ammonia gas over a period of 0.5 hour at a temperature of 25° C. The treated monolith was dried at 120° C. overnight, calcined for six hours at 260° C. and further calcined at 649° C. overnight. After cooling to room temperature the monolith was then immersed in an aqueous solution containing 0.08 weight per cent of chloroplatinic acid for one hour, drained and then, while still wet, contacted with 10,000 cubic centimeters of $H_2S$ gas over a period of one hour at a temperature of 25° C. The treated monolith contained 0.12 weight per cent of ruthenium and 0.1 weight per cent of platinum, each calculated as metal, based on the weight of the support. The support was then used to treat an auto exhaust gas as in Example II. The results obtained are set forth below in Table VII.

Table VII

| Component In Treated Exhaust Gas | Under Reducing Conditions | Under Oxidizing Conditions |
| --- | --- | --- |
| $NO_x$, ppm | 75 | NT |
| $NH_3$, ppm | 90 | NT |
| CO, Volume % | NT | 1.4 |
| Unburned Hydrocarbons, ppm | NT | 910 |

NT - Not Taken

EXAMPLE VII

The runs of Example VI were repeated with a catalyst similarly prepared except that the support was first treated with the solution containing chloroplatinic acid and then with the solution containing ruthenium chloride. The results obtained are tabulated below in Table VIII.

Table VIII

| Component In Treated Exhaust Gas | Under Reducing Conditions | Under Oxidizing Conditions |
| --- | --- | --- |
| $NO_x$, ppm | 18 | NT |
| $NH_3$, ppm | 4 | NT |
| CO, Volume % | NT | 0.3 |
| Unburned Hydrocarbons, ppm | NT | 14 |

NT - Not Taken

EXAMPLE VIII

The runs of Example VII were repeated with catalyst similarly prepared, except that the metal level was 0.06 weight per cent platinum and 0.06 weight per cent ruthenium. The results obtained with the engine exhaust were similar to those of Table VIII.

Results similar to the above will be obtained in the event a palladium salt is used to replace the platinum salt, a rhodium salt is used to replace the ruthenium salt and/or an oxide or salt of phosphorus is used to replace the phosphorus acid.

That it is imperative that the catalyst effective for removing nitrogen oxides under a reducing atmosphere and carbon monoxide and unburned hydrocarbons under an oxidizing atmosphere be prepared by first coating the support with platinum or palladium, calcining, further coating with ruthenium or rhodium and an oxide, salt or acid of phosphorus is apparent from the data in the examples above. Thus, in Example I it can be seen that ruthenium is not as effective an oxidation catalyst as it platinum. In Examples II and III the data show that while ruthenium is an effective reduction catalyst, it is not very effective as an oxidation catalyst. Conversely, while platinum is again shown to be an effective oxidation catalyst, its effectiveness as a reduction catalyst is negligible. The data in Examples IV and V show that even when the ruthenium and platinum are coprecipitated on the support, the catalyst is not effective for both reduction and oxidation. It can be seen from Example VI that when the catalyst is prepared by first adding ruthenium to the support and then platinum, the catalyst obtained is not effective for both reduction and oxidation. However, Example VII shows that if the platinum is first placed on the support, followed by ruthenium, the resultant catalyst is effective for use in both the reduction and oxidation stages in the treatment of auto exhaust gases.

Why it is critical, in producing a catalyst herein that can function equally well in a reducing or oxidation mode, that the platinum or palladium and the ruthenium or rhodium be placed separately on the support and, moreover, that the platinum or palladium be placed on the support prior to ruthenium or rhodium, rather than ruthenium or rhodium prior to platinum or palladium, we are not certain. It is most unusual that this be so, for we do not believe that the phenomenon involved is due to the selective building up of one coating of metal on the other. Thus, we have calculated that if the amount of metals defined herein were placed on the supports defined herein as monomolecular layers thereof, the metal coatings would not cover all of the surface area of the support.

Obviously, many modifications and variations of the invention, as hereinabove set forth, can be made without departing from the spirit and scope thereof, and

We claim:

1. A process for preparing a catalyst which comprises coating a support with a first solution containing a first metal salt selected from the group consisting of a salt of platinum and palladium, calcining, further coating the calcined base with a second solution containing a second metal salt selected from the group consisting of a salt of ruthenium and rhodium and a phosphorus compound selected from the group consisting of a phosphorus oxide, a phosphorus salt and a phosphorus acid and then further calcining.

2. The process of claim 1 wherein said first metal salt is a platinum salt.

3. The process of claim 1 wherein said first metal salt is chloroplatinic acid.

4. The process of claim 1 wherein said second metal salt is a ruthenium salt.

5. The process of claim 1 wherein said second metal salt is ruthenium chloride.

6. The process of claim 1 wherein said phosphorus compound is phosphoric acid.

7. The process of claim 1 wherein said support is composed of a refractory oxide.

8. The process of claim 1 wherein said support is composed of alumina.

9. The process of claim 1 wherein said support has a surface area of about 1 to about 500 square meters per gram.

10. The process of claim 1 wherein said support has a surface area of about 10 to about 300 square meters per gram.

11. The process of claim 1 wherein following said first coating but prior to said first calcination said coated support is contacted with $H_2S$ gas.

12. The process of claim 11 wherein said contact with $H_2S$ is effected in a temperature range of about 5° to about 80° C.

13. The process of claim 11 wherein said contact with $H_2S$ is effected in a temperature range of about 15° to about 40° C.

14. The process of claim 1 wherein following said second coating but prior to said second calcination said coated support is contacted with ammonia gas.

15. The process of claim 14 wherein said contact with ammonia gas is effected in a temperature range of about 5° to about 90° C.

16. The process of claim 14 wherein said contact with ammonia gas is effected in a temperature range of about 15° to about 70° C.

17. The process of claim 1 wherein said second solution also contains a refractory material.

18. The process of claim 17 wherein said refractory material is aluminum chloride.

19. The process of claim 1 wherein the support obtained contains from about 0.001 to about two weight per cent of platinum or palladium and about 0.03 to about two weight per cent of combined ruthenium or rhodium and phosphorus.

20. The process of claim 1 wherein the support obtained contains from about 0.01 to about 0.8 weight per cent of platinum or palladium and about 0.05 to about one weight per cent of combined ruthenium or rhodium and phosphorus.

21. The process of claim 19 wherein the weight ratio of ruthenium or rhodium to phosphorus is in the range of about 1:0.1 to about 1:400.

22. The process of claim 19 wherin the weight ratio of ruthenium or rhodium to phosphorus wherein in the range of about 1:1 to about 1:100.

23. The process of claim 1 wherein the weight ratio of platinum or palladium to combined ruthenium or rhodium and phosphorus is in the range of about 1:10 to about 10:1.

24. The process of claim 1 wherein the weight ratio of platinum or palladium to combined ruthenium or rhodium and phosphorus is in the range of about 1:10 to about 5:1.

* * * * *